US010875404B2

(12) United States Patent
Shinkai et al.

(10) Patent No.: US 10,875,404 B2
(45) Date of Patent: Dec. 29, 2020

(54) WORK VEHICLE, CONTROL METHOD FOR WORK VEHICLE, AND COOPERATIVE WORK VEHICLE MONITORING SYSTEM

(71) Applicant: Kubota Corporation, Osaka-shi (JP)

(72) Inventors: Atsushi Shinkai, Sakai (JP); Kazuo Sakaguchi, Amagasaki (JP); Izuru Shimamoto, Amagasaki (JP); Kenji Tamatani, Amagasaki (JP); Megumi Suzukawa, Amagasaki (JP)

(73) Assignee: KUBOTA CORPORATION, Osaka-Shi (JP)

( * ) Notice: Subject to any disclaimer, the term of this patent is extended or adjusted under 35 U.S.C. 154(b) by 0 days.

(21) Appl. No.: 15/842,812

(22) Filed: Dec. 14, 2017

(65) Prior Publication Data

US 2018/0208059 A1    Jul. 26, 2018

(30) Foreign Application Priority Data

Jan. 20, 2017   (JP) ................. 2017-008359

(51) Int. Cl.
*B60K 35/00* (2006.01)
*G05D 1/02* (2020.01)
(Continued)

(52) U.S. Cl.
CPC ........... *B60K 35/00* (2013.01); *G05D 1/0295* (2013.01); *G06F 3/04847* (2013.01); *G06F 3/14* (2013.01);
(Continued)

(58) Field of Classification Search
CPC ............ B60K 35/00; B60K 2350/1076; B60K 2350/352; B60K 2370/152;
(Continued)

(56) References Cited

U.S. PATENT DOCUMENTS 5,261,495 A * 11/1993 Szymczak ........... A01B 63/1117
                                                        172/2
6,148,255 A    11/2000 van der Lely
(Continued)

FOREIGN PATENT DOCUMENTS

| JP | 3468487 B2 | 10/1997 |
| JP | 2001-507843 | 6/2001 |
| WO | WO 2016/017367 | 2/2016 |

OTHER PUBLICATIONS

Extended European Search Report for corresponding EP Application No. 17001990.5-1204, dated May 14, 2018.

*Primary Examiner* — Daniel W Parcher
(74) *Attorney, Agent, or Firm* — Mori & Ward, LLP

(57) ABSTRACT

A work vehicle includes a display, communication circuitry, and circuitry. The display is to display information. The communication circuitry is configured to communicate with a cooperative work vehicle that is configured to work cooperatively with the work vehicle. The circuitry is configured to acquire from the cooperative work vehicle through the communication circuitry traveling work parameters manually set via operation tools provided on an operation panel in the cooperative work vehicle. The circuitry is configured to display in the display a setting confirmation screen based on the traveling work parameters acquired through the communication circuitry, the setting confirmation screen showing the operation panel in the cooperative work vehicle.

17 Claims, 4 Drawing Sheets

(51) Int. Cl.
*H04Q 9/00* (2006.01)
*G06F 3/0484* (2013.01)
*G06F 3/14* (2006.01)
*G08C 17/00* (2006.01)
*A01B 71/02* (2006.01)
*A01B 76/00* (2006.01)

(52) U.S. Cl.
CPC ............... *H04Q 9/00* (2013.01); *A01B 71/02* (2013.01); *A01B 76/00* (2013.01); *B60K 2370/152* (2019.05); *B60K 2370/155* (2019.05); *B60K 2370/52* (2019.05); *B60K 2370/589* (2019.05); *B60K 2370/61* (2019.05); *B60Y 2200/22* (2013.01); *G05D 2201/0201* (2013.01); *G08C 17/00* (2013.01)

(58) Field of Classification Search
CPC .......... B60K 2370/52; B60K 2370/589; B60K 2370/61; B60K 2370/155; G06F 3/14; G06F 3/04847; G05D 1/0295; G05D 2201/0201; G05D 1/0246; H04Q 9/00; A01B 76/00; A01B 71/02; A01B 51/026; A01B 69/00; G08C 17/00; B60Y 2200/22
See application file for complete search history.

(56) References Cited

U.S. PATENT DOCUMENTS

| | | | |
|---|---|---|---|
| 6,336,051 B1* | 1/2002 | Pangels | A01B 79/005 |
| | | | 700/207 |
| 7,683,771 B1* | 3/2010 | Loeb | B60K 35/00 |
| | | | 340/438 |
| 8,542,108 B1* | 9/2013 | Izdepski | G09G 5/00 |
| | | | 340/438 |
| 2011/0058691 A1* | 3/2011 | Okabayashi | H04H 60/04 |
| | | | 381/119 |
| 2012/0029729 A1* | 2/2012 | Weslati | B60H 1/00385 |
| | | | 701/2 |
| 2015/0123912 A1* | 5/2015 | Nikolic | B64D 43/00 |
| | | | 345/173 |
| 2017/0131722 A1* | 5/2017 | Hiramatsu | A01B 69/008 |
| 2017/0160748 A1* | 6/2017 | Nakagawaa | A01B 69/00 |
| 2017/0168501 A1* | 6/2017 | Ogura | G05D 1/0278 |
| 2017/0177002 A1* | 6/2017 | Ogura | A01B 69/008 |
| 2018/0215393 A1* | 8/2018 | Miyakubo | G05D 1/0278 |

* cited by examiner

WORK VEHICLE, CONTROL METHOD FOR WORK VEHICLE, AND COOPERATIVE WORK VEHICLE MONITORING SYSTEM

CROSS-REFERENCE TO RELATED APPLICATIONS

The present application claims priority under 35 U.S.C. § 119 to Japanese Patent Application No. 2017-008359, filed Jan. 20, 2017. The contents of this application are incorporated herein by reference in their entirety.

BACKGROUND OF THE INVENTION

Field of the Invention

The present invention relates to a work vehicle, a control method for a work vehicle, and a cooperative work vehicle monitoring system.

Discussion of the Background

For example, a conventional work vehicle is described in Japanese translation of a PCT application No. 2001-507843. The work vehicle described in Japanese translation of a PCT application No. 2001-507843 includes a communication unit (in Japanese translation of a PCT application No. 2001-507843, a "wireless remote control device") that can communicate with another work vehicle (in Japanese translation of a PCT application No. 2001-507843, a "slave vehicle") that can perform cooperative work.

SUMMARY OF THE INVENTION

According to one aspect of the present invention, a work vehicle includes a display, communication circuitry, and circuitry. The display is to display information. The communication circuitry is configured to communicate with a cooperative work vehicle that is configured to work cooperatively with the work vehicle. The circuitry is configured to acquire from the cooperative work vehicle through the communication circuitry traveling work parameters manually set via operation tools provided on an operation panel in the cooperative work vehicle. The circuitry is configured to display in the display a setting confirmation screen based on the traveling work parameters acquired through the communication circuitry, the setting confirmation screen showing the operation panel in the cooperative work vehicle.

According to another aspect of the present invention, a cooperative work vehicle monitoring system includes a first work vehicle, a second work vehicle, and a communication system. The first work vehicle includes a display to display information. The second work vehicle is to work cooperatively with the first work vehicle. The second work vehicle includes an operation panel including operation tools via which traveling work parameters are manually set. The first work vehicle and the second work vehicle are configured to communicate with each other via a communication system. The first work vehicle further includes circuitry configured to acquire the traveling work parameters from the second work vehicle through the communication system, and to display in the display a setting confirmation screen based on the traveling work parameters acquired through the communication system, the setting confirmation screen showing the operation panel in the second work vehicle.

According to further aspect of the present invention, a control method for a work vehicle includes communicating with a cooperative work vehicle that is configured to work cooperatively with the work vehicle. Traveling work parameters manually set via operation tools provided on an operation panel in the cooperative work vehicle are acquired from the cooperative work vehicle. A setting confirmation screen is displayed in a display based on the traveling work parameters acquired. The setting confirmation screen shows the operation panel in the cooperative work vehicle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
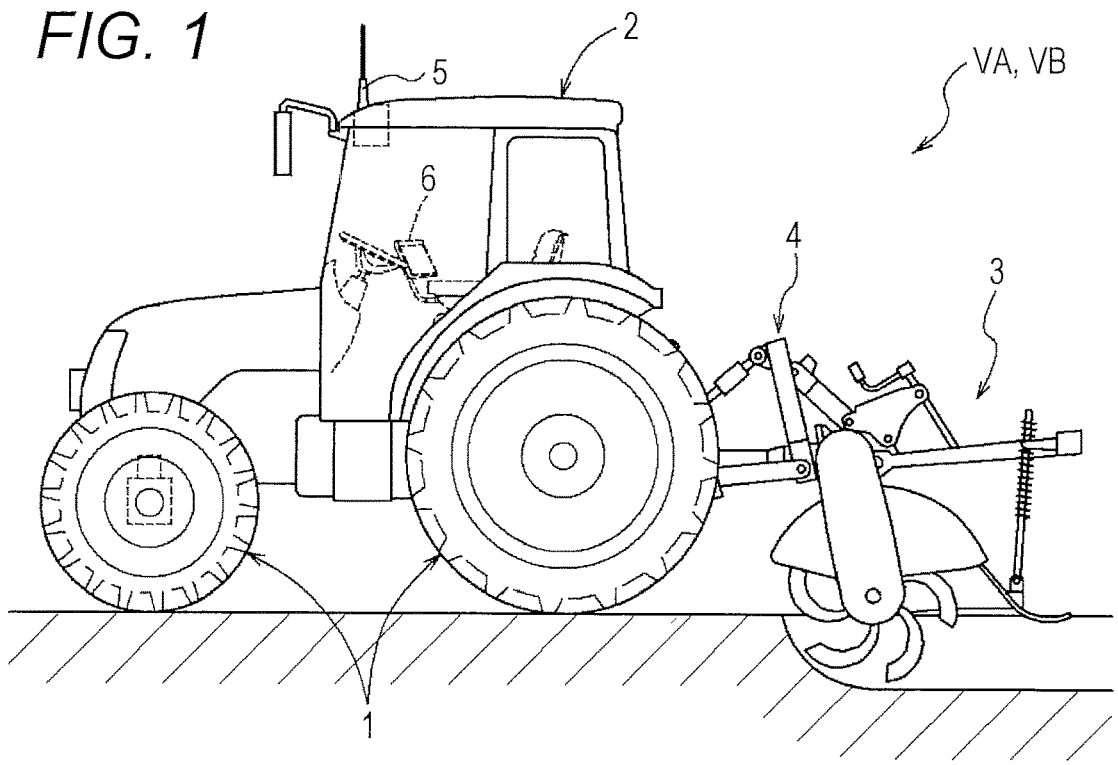
FIG. 1 is a side view illustrating an example of a configuration of a tractor.

The embodiments will now be described with reference to the accompanying drawings, wherein like reference numerals designate corresponding or identical elements throughout the various drawings.

Example of Configuration of Work Vehicle

An exemplary embodiment of the present invention will be described below with reference to the drawings.

As illustrated in FIG. 1, a tractor (an example of a "work vehicle") includes a four-wheeled traveling device 1 that causes a machine body to travel, a driving section 2 that an operator can get on to perform driving operation, a work device 3 that can perform ground work on a field, a lifting connecting mechanism 4 that couples the work device 3 to the machine body so as to be able to lift the work device 3 relative to the machine of the machine body and so as to be able to swing about a longitudinal axis, a mobile station 5 that can receive GNSS positional information, and a work terminal 6 that can perform various operation inputs and presentations of information.

As illustrated in FIG. 1, the driving section 2 includes the work terminal 6. That is, the work terminal 6 is an on-vehicle type fixed to the driving section 2 of the tractor.

Cooperative Control

Figure 2:
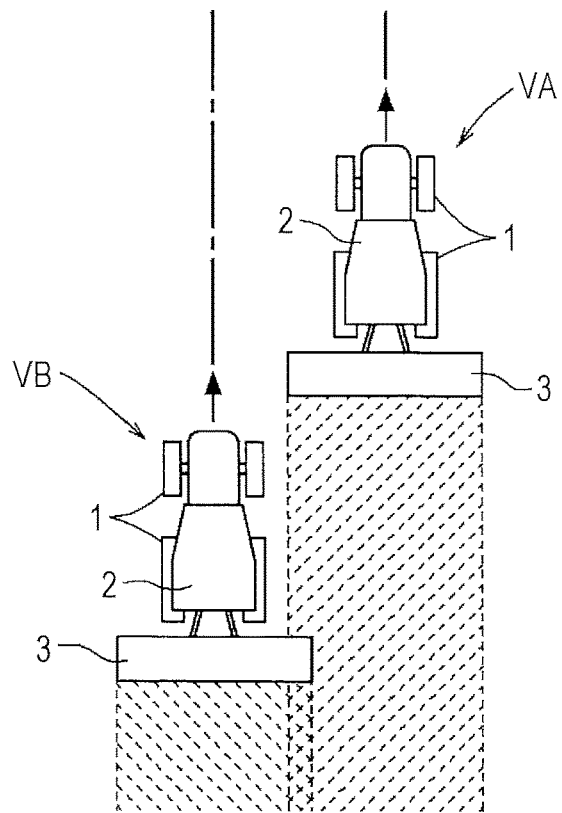
FIG. 2 is a schematic diagram illustrating an example of cooperative work of tractors.

As illustrated in FIG. 2, a master machine VA (an example of the "work vehicle" and a "first work vehicle") that is the tractor having the above configuration and a slave machine VB (an example of "another work vehicle", a "cooperative work vehicle", and a "second work vehicle") that is the tractor having the above configuration are configured to be able to run side by side and perform cooperative work in the field while communicating with each other. In the example of FIG. 2, the master machine VA starts first while the slave machine VB runs behind the master machine VA. Alternatively, the slave machine VB may start first while the master machine VA runs side by side behind the slave machine VB.

The master machine VA is a manned vehicle that travels while the operator gets on board. For example, the slave machine VB may be an unmanned vehicle that a person does not get on board during the cooperative work, or a manned vehicle that a person gets on boards during the cooperative work. The master machine VA and the slave machine VB can independently be used as a normal tractor when not performing the cooperative work.

Figure 3:
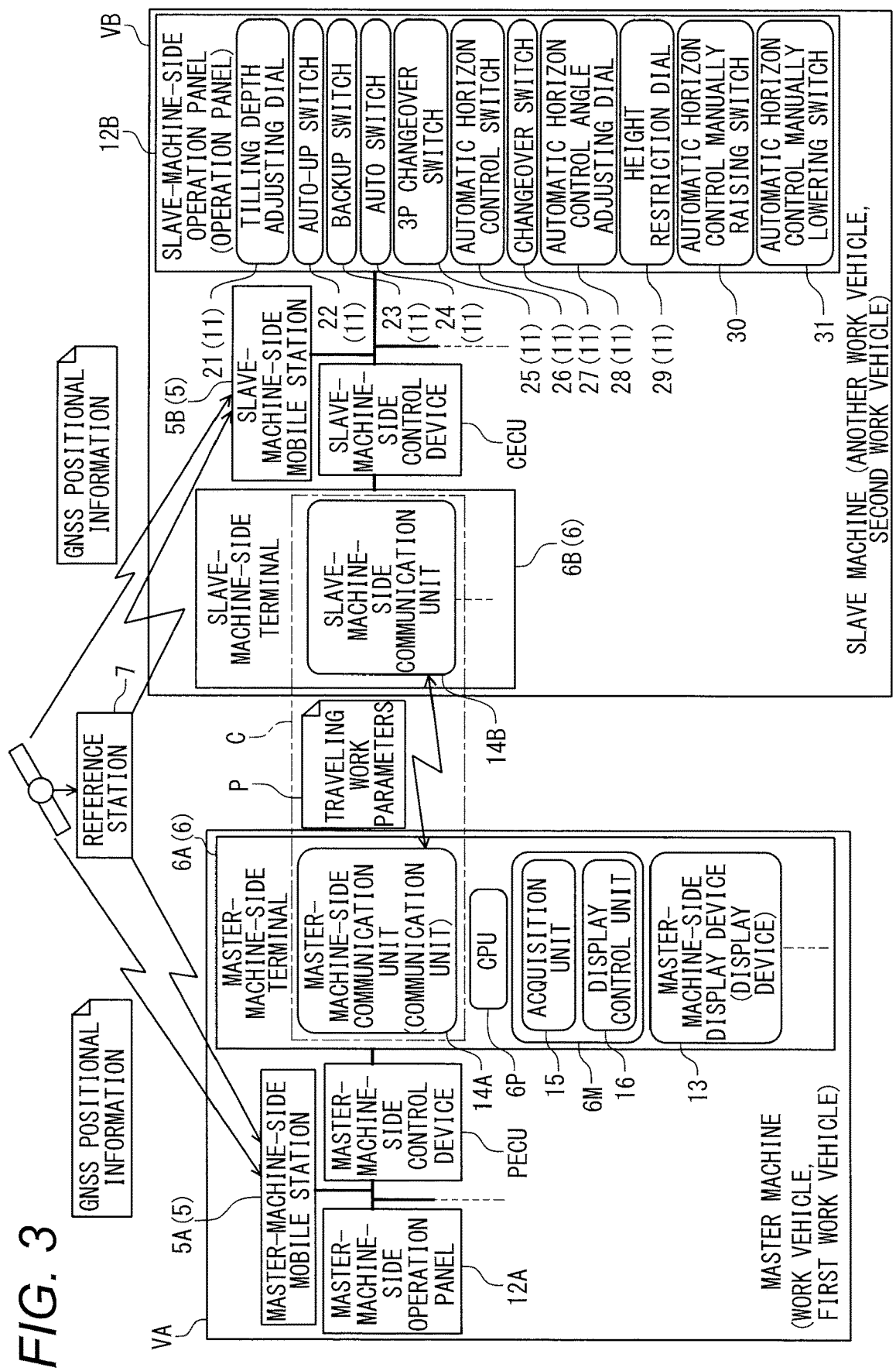
FIG. 3 is a structure of an other-vehicle monitoring system.

As illustrated in FIG. 3, a master-machine-side mobile station 5A of the master machine VA receives the GNSS positional information from both a GNSS satellite 8 and a fixed reference station 7 that acquires the GNSS positional information from the GNSS satellite 8, and the master machine VA accurately obtains an own position based on the GNSS positional information, and automatically travels along a travel route of the master machine VA under the control of a master-machine-side terminal 6A that is the work terminal 6. A slave-machine-side mobile station 5B of the slave machine VB receives the GNSS positional information from both the GNSS satellite 8 and the reference station 7 that acquires the GNSS positional information from the GNSS satellite 8, and the slave machine VB accurately obtains the own position based on the GNSS positional information, and automatically travels along the travel route of the slave machine VB under the control of the master-machine-side terminal 6A which is the work terminal 6.

Other-Vehicle Monitoring System

FIG. 3 illustrates an example of a main-part configuration of an other-vehicle monitoring system. Only the main-part configuration is illustrated in FIG. 3. However, in the exemplary embodiment, the master machine VA and the slave machine VB have the same specifications. The other-vehicle monitoring system is provided with the master machine VA, the slave machine VB that can perform the cooperative work with the master machine VA, a communication system C that communicably connects the master machine VA and the slave machine VB.

As illustrated in FIG. 3, the master machine VA acquires traveling work parameters P from the slave machine VB through the communication system C, and displays an other-vehicle setting checking screen (setting confirmation screen) S on a display device (display) 13 provided in the master machine VA. The other-vehicle setting checking screen S virtually shows a state of a slave-machine-side operation panel 12B (corresponding to the "operation panel") including a setting state by each setting operation tool 11 of the slave machine VB based on the acquired traveling work parameters P.

The master machine VA includes the display device 13 that can display information, a master-machine-side communication unit 14A (corresponding to the "communication unit" or "communication circuitry") that can communicate with the slave machine VB capable of performing the cooperative work, an acquisition unit 15 that acquires, from the slave machine VB through the master-machine-side communication unit 14A, the traveling work parameters P manually set in each item by a plurality of setting operation tools 11 provided in the slave-machine-side operation panel 12B included in the slave machine VB, and a display control unit 16 that causes the display device 13 to display the other-vehicle setting checking screen S virtually showing the state of the slave-machine-side operation panel 12B including the setting state by each of the setting operation tools 11 of the slave machine VB based on the traveling work parameters P acquired by the acquisition unit 15. More specifically, the master-machine-side terminal 6A includes a CPU (circuitry) 6P and a memory 6M. Programs of the acquisition unit 15 and the display control unit 16 are stored in the memory 6M and executed by the CPU 6P to perform the above functions.

The slave machine VB includes the slave-machine-side operation panel 12B provided with the plurality of setting operation tools 11 that can manually set the traveling work parameters P in each item. The slave machine VB includes a slave-machine-side terminal 6B that is the work terminal 6 including a slave-machine-side communication unit 14B.

Operation Panel and Setting Operation Tool

Figure 4:
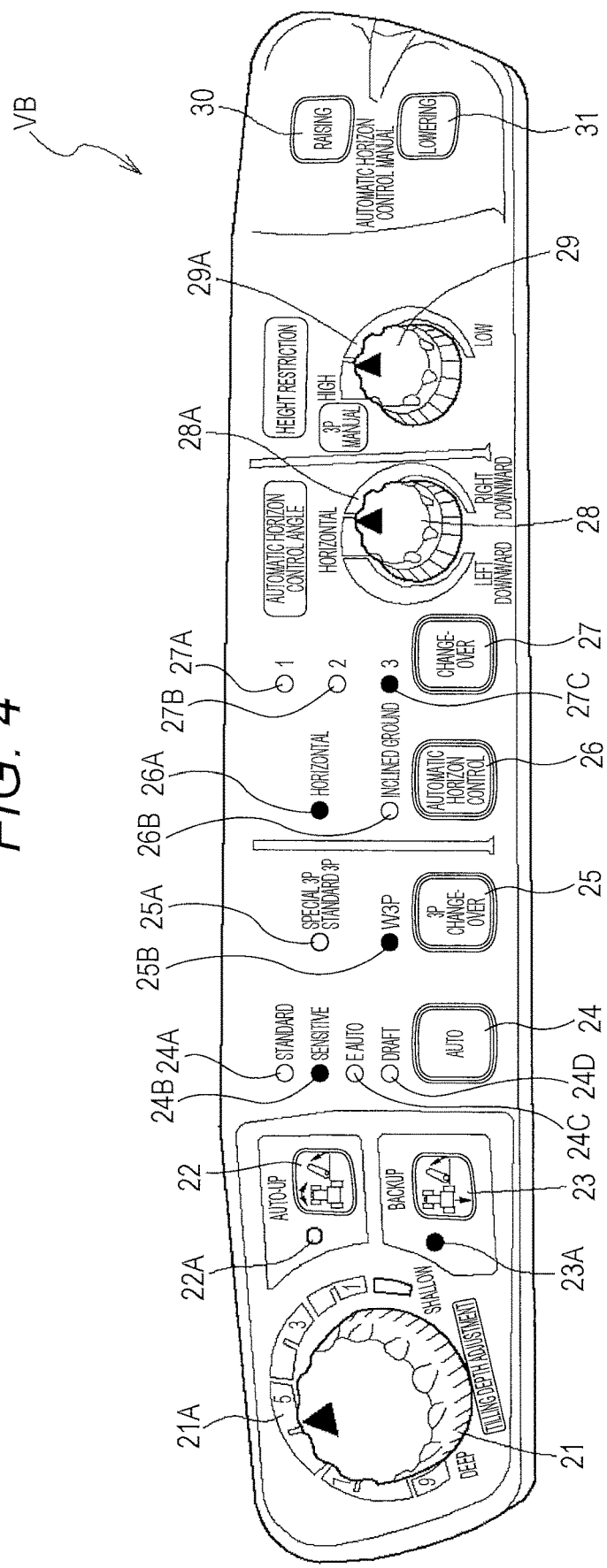
FIG. 4 is a view illustrating a slave-machine-side operation panel in a slave machine.

As illustrated in FIG. 4, the slave-machine-side operation panel 12B includes a tilling depth adjusting dial 21, an auto-up switch 22, a backup switch 23, an auto switch 24, a 3P changeover switch 25, an automatic horizon control switch 26, a changeover switch 27, an automatic horizon control angle adjusting dial 28, and a height restriction dial 29 as the setting operation tool 11 that can adjust the setting state of each item of the traveling work parameters P of the slave machine VB by manual operation. The slave-machine-side operation panel 12B also includes an automatic horizon control manually raising switch 30 and an automatic horizon control manually lowering switch 31. Operation signals of each setting operation tool 11, the automatic horizon control manually raising switch 30, and the automatic horizon control manually lowering switch 31 are input to a slave-machine-side control device CECU.

An operation tool disposed on the slave-machine-side operation panel 12B will be described below.

The tilling depth adjusting dial 21 is configured as a dial operation type. When the auto switch 24 is in a "standard" state, a "sensitive" state, and an "E auto" state, the tilling depth adjusting dial 21 manually adjusts a dial operation position of the tilling depth adjusting dial 21, thereby adjusting a tilling depth of the work device 3. The tilling depth adjusting dial 21 can variably adjust the dial operation position between a "deep position" and a "shallow position". As the dial operation position of the tilling depth adjusting dial 21 is brought closer to the "deep position", the tilling depth of the tilling performed by the work device 3 is set deeper. On the other hand, as the dial operation position of the tilling depth adjusting dial 21 is brought closer to the "shallow position", the tilling depth of the tilling performed by the work device 3 is set shallower. A tilling depth position indicator 21A indicating the dial operation position of the tilling depth adjusting dial 21 is provided in the vicinity of the tilling depth adjusting dial 21.

The auto-up switch 22 is configured as a pressing operation type. When the auto-up switch 22 is set to an "on state" by the operation, the work device 3 is automatically raised with respect to the machine during turning of the machine body. An auto-up lamp 22A positioned in the vicinity of the auto-up switch 22 is lit in the "on state" of the auto-up switch 22. On the other hand, when the auto-up switch 22 is set to an "off state" by the operation, the work device 3 is not automatically raised with respect to the machine during the turning of the machine body. The auto-up lamp 22A is turned off in the "off state" of the auto-up switch 22.

The backup switch 23 is configured as a pressing operation type. When the backup switch 23 is set to the "on state" by operation, the work device 3 is automatically raised with respect to the machine during backward traveling of the machine body. A backup lamp 23A located in the vicinity of the backup switch 23 is lit in the "on state" of the backup switch 23. On the other hand, when the backup switch 23 is set to the "off state" by the operation, the work device 3 is not automatically raised with respect to the machine during the backward traveling of the machine body. The backup switch 23 is turned off in the "off state" of the backup switch 23.

The auto switch 24 is configured as a pressing operation type.

When being set to the "standard" state by operation, the auto switch 24 is suitable for performing general work from shallow plowing to deep plowing by the work device 3. A standard lamp 24A located in the vicinity of the auto switch 24 is lit when the auto switch 24 is set to the "standard" state.

On the other hand, when being set to the "sensitive" state by operation, the auto switch 24 is suitable for the case that the work device 3 improves finish of work such as pudding work in a wet field. A sensitive lamp 24B located in the vicinity of the auto switch 24 is lit when the auto switch 24 is set to the "sensitive" state.

When the auto switch 24 is set to the "E auto" state by operation, the work device 3 suitably performs automatic operation, in which the work device 3 performs work such as rough plowing while raising a rotary cover with no use of the rear wheel. An E auto lamp 24C located in the vicinity of the auto switch 24 is lit when the auto switch 24 is set to the "E auto" state.

When the auto switch 24 is set to a "draft" state by operation, the work device 3 suitably performs draft work. A draft lamp 24D located in the vicinity of the auto switch 24 is lit when the auto switch 24 is set to the "draft" state.

Automatic control is canceled when the auto switch 24 is set to the "off state" by operation. The standard lamp 24A, the sensitive lamp 24B, the E auto lamp 24C, and the draft lamp 24D, which are related to the auto switch 24 are turned off when the auto switch 24 is set to the "off state".

The 3P changeover switch 25 is configured as a pressing operation type. The 3P changeover switch 25 is a switch that selects specifications of the work device 3 attached to the machine. When the 3P changeover switch 25 is set to a "special 3P and standard 3P" state by operation, the setting is suitable for the work device 3 provided with a special 3P auto hitch frame and the work device 3 for standard 3P. A special 3P and standard 3P lamp 25A located in the vicinity of the 3P changeover switch 25 is lit when the 3P changeover switch 25 is set to the "special 3P and standard 3P" state. On the other hand, when the 3P changeover switch 25 is set to a "W3P" state by operation, the setting is suitable for the work device 3 provided with a W3P auto hitch frame. The W3P lamp 25B is lit when the 3P changeover switch 25 is set to the "W3P" state. Every time the 3P changeover switch 25 is pressed, the "special 3P and standard 3P" state and the "W3P" state are switched in order.

When the automatic horizon control switch 26 is set to the "off state", or when the auto switch 24 is set to the "off state", the operation of the 3P changeover switch 25 becomes invalid.

The automatic horizon control switch 26 is configured as a pressing operation type. The automatic horizon control switch 26 is operated in order to maintain the work device 3 in a horizontal orientation or in an orientation at a fixed angle with respect to a ground irrespective of the orientation of the machine.

When the automatic horizon control switch 26 is set to a "horizontal" state by operation, the orientation of the work device 3 is horizontally maintained even if the orientation of the machine changes due to an irregular shape of the field. A horizontal lamp 26A located in the vicinity of the automatic horizon control switch 26 is lit when the automatic horizon control switch 26 is set in the "horizontal" state.

On the other hand, when the automatic horizon control switch 26 is set to an "inclined ground" state by operation, the orientation of the work device 3 is maintained in parallel to the inclined ground. An inclined ground lamp 26B located in the vicinity of the automatic horizon control switch 26 is lit when the automatic horizon control switch 26 is set to the "inclined ground" state.

The automatic control of the Monroematic is canceled when the automatic horizon control switch 26 is set to the "off state" by operation. The horizontal lamp 26A and the inclined ground lamp 26B are turned off when the automatic horizon control switch 26 is set to the "off state".

The changeover switch 27 is configured as a pressing operation type. The changeover switch 27 can set an attachment state of a link mechanism of the work device 3.

When the changeover switch 27 is set to a "1" state by operation, the width between lower links of the link mechanism is widened and a link attachment hole is suitable for the link mechanism closer to a rear. A 1 lamp 27A located in the vicinity of the changeover switch 27 is lit when the changeover switch 27 is set to the "1" state.

On the other hand, when the changeover switch 27 is set to a "2" state by operation, the width between the lower links of the link mechanism is widened and the link attachment hole is suitable for the link mechanism closer to a front. A 2 lamp 27B located in the vicinity of the changeover switch 27 is lit when the changeover switch 27 is set to the "2" state.

When the changeover switch 27 is set to a "3" state by operation, the width between the lower links of the link mechanism is narrowed, and the link attachment hole is suitable for the link mechanism closer to the front. A 3 lamp 27C located in the vicinity of the changeover switch 27 is lit when the changeover switch 27 is set to the "3" state.

When the 3P changeover switch 25 is set to the "W3P" state, the changeover switch 27 is automatically set to one of the "1" state, the "2" state, and the "3" state, and the corresponding lamp is lit.

When the automatic horizon control switch 26 is in the "off state", the operation of the changeover switch 27 becomes invalid, and the 1 lamp 27A, the 2 lamp 27B, and the 3 lamp 27C are turned off.

The automatic horizon control angle adjusting dial 28 is configured as a dial operation type. The automatic horizon control angle adjusting dial 28 can adjust the orientation of the work device 3 by manually adjusting the dial operation position of the automatic horizon control angle adjusting dial 28 when the automatic horizon control switch 26 is in the "horizontal" state.

The automatic horizon control angle adjusting dial 28 can variably adjust the dial operation position between a "lower left position" and a "lower right position". There is a "horizontal position" between the "lower left position" and the "lower right position". When the dial operation position of the automatic horizon control angle adjusting dial 28 is set to the "horizontal position", the orientation of the work device 3 is maintained in the horizontal state. On the other hand, as the dial operation position of the automatic horizon control angle adjusting dial 28 is brought closer to the "lower left position" from the "horizontal position", the work device 3 is maintained in a more left downward orientation. As the dial operation position of the automatic horizon control angle adjusting dial 28 is brought closer to the "lower right position" from the "horizontal position", the work device 3 is maintained in a more right downward orientation.

An automatic horizon control angle index 28A indicating the dial operation position of the automatic horizon control angle adjusting dial 28 is provided in the vicinity of the automatic horizon control angle adjusting dial 28.

The height restriction dial 29 is configured in a dial operation type. The height restriction dial 29 is used to set a raising upper limit position where the link mechanism of the work device 3 can be raised.

The height restriction dial 29 can variably adjust the dial operation position between a "3P manual position" and a "low position". Between the "3P manual position" and the "low position", a "high position" is provided at a position close to the "3P manual position".

The raising upper limit position of the link mechanism of the work device 3 is raised when the height restriction dial 29 is set to the "high position" by operation.

On the other hand, the raising upper limit position of the link mechanism of the work device 3 is lowered when the height restriction dial 29 is set to the "low position" by operation.

When the height restriction dial 29 is set to the "3P manual position" by operation, the work device 3 can manually be raised and lowered by the automatic horizon control manually raising switch 30 and the automatic horizon control manually lowering switch 31 regardless of various controls.

A height restriction index 29A indicating the dial operation position of the height restriction dial 29 is provided in the vicinity of the height restriction dial 29.

The automatic horizon control manually raising switch 30 is configured as a pressing operation type. When pressing operation of the automatic horizon control manually raising switch 30 is performed while the height restriction dial 29 is set to the "3P manual position", the work device 3 is raised while the pressing operation is performed.

The automatic horizon control manually lowering switch 31 is configured as a pressing operation type. When the pressing operation of the automatic horizon control manually lowering switch 31 is performed while the height restriction dial 29 is set to the "3P manual position", the work device 3 is lowered while the pressing operation is performed.

The traveling work parameters P including the setting state of each setting operation tool 11 by each item input to the slave-machine-side control device CECU is output to the slave-machine-side communication unit 14B, and transmitted to the master-machine-side communication unit 14A through a wireless communication line. The traveling work parameters P is output from the master-machine-side communication unit 14A to the acquisition unit 15 of a master-machine-side control device PECU. The traveling work parameters P of the slave machine VB, which is input to the acquisition unit 15, is reconstructed as an image by the display control unit 16, and the state of the slave-machine-side operation panel 12B of the slave machine VB is virtually shown in the other-vehicle setting checking screen S of the display device 13 of the master machine VA as illustrated in FIG. 5.

When the setting state (the state indicated by the dial position or the lamp) of the setting operation tool 11 is changed by operating the setting operation tool 11 of the slave machine VB, the traveling work parameters P is changed, and the changed setting state of the setting operation tool 11 of the slave machine VB can rapidly be shown in the other-vehicle setting checking screen S of the display device 13 of the master machine VA.

In addition to the other-vehicle setting checking screen S, the display device 13 of the master machine VA can switch the display to various screens.

Figure 5:
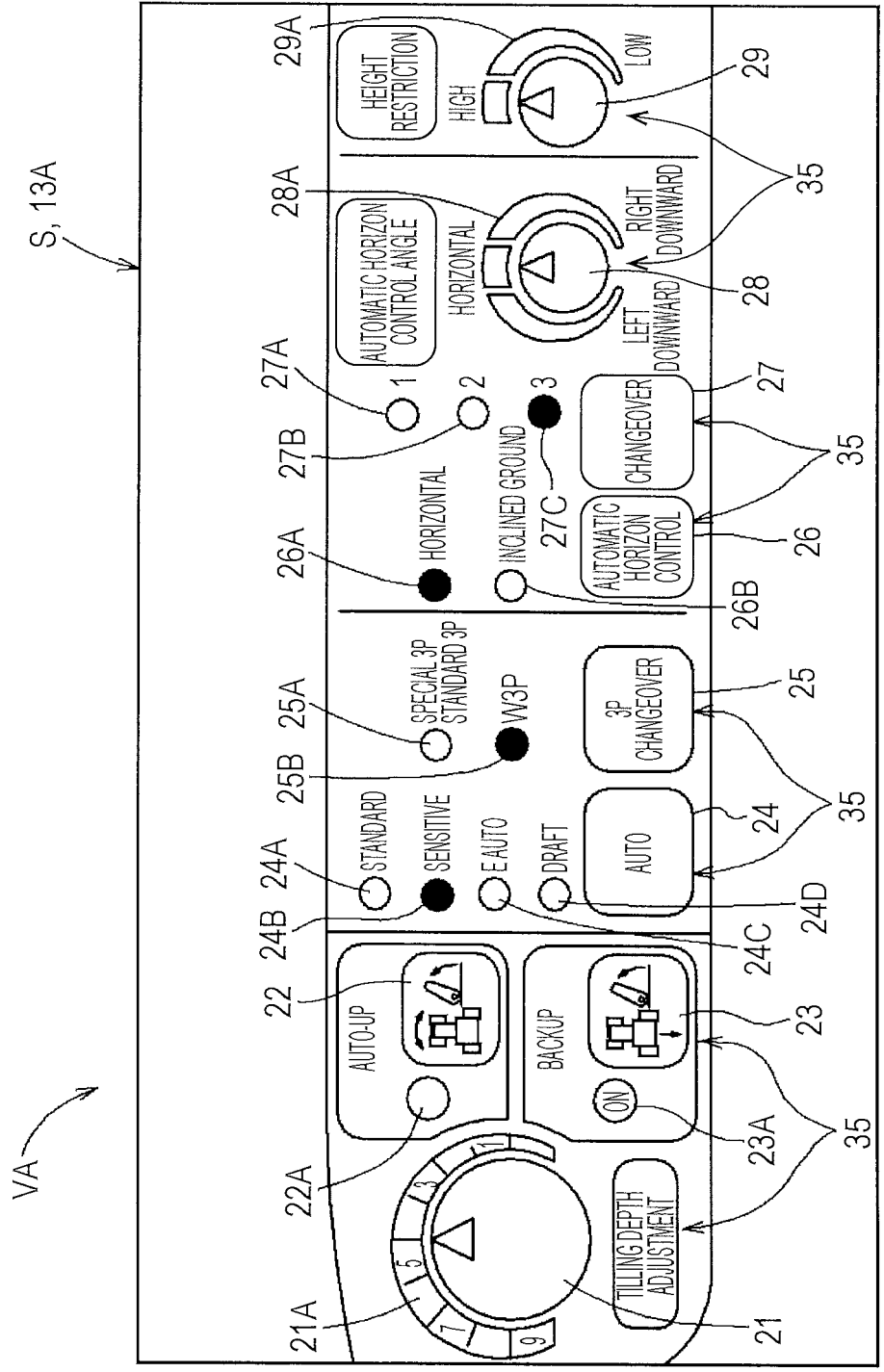
FIG. 5 is a view illustrating an other-vehicle setting checking screen in a display device of a master machine.

As illustrated in FIG. 5, in the master machine VA, a picture 35 imitating the actual shape of the setting operation tool 11 in the slave-machine-side operation panel 12B is shown in the other-vehicle setting checking screen S of the display device 13. In the master machine VA, the setting state by each setting operation tool 11 is shown while an actual arrangement mode of the plurality of setting operation tools 11 on the slave-machine-side operation panel 12B of the slave machine VB is maintained in the other-vehicle setting checking screen S of the display device 13. In the master machine VA, only the portion corresponding to some of the plurality of items that can be set on the slave-machine-side operation panel 12B is shown in the other-vehicle setting checking screen S of the display device 13.

Specifically, as illustrated in FIG. 4, the actual slave-machine-side operation panel 12B of the slave machine VB has a non-planar shape. However, as illustrated in FIG. 5, the state of the slave-machine-side operation panel 12B reconstructed and shown in the other-vehicle setting checking screen S of the display device 13 of the master machine VA is shown while deformed into a planar shape. As illustrated in FIG. 4, each actual setting operation tool 11 of the slave machine VB includes the setting operation tool 11 in a partially inclined orientation when viewed from one direction. However, as illustrated in FIG. 5, the state of each setting operation tool 11 shown in the other-vehicle setting checking screen S of the display device 13 of the master machine VA is shown in the deformed state such that all the setting operation tools 11 are seen in a planar manner. Therefore, the states of the slave-machine-side operation panel 12B and each setting operation tool 11 of the slave machine VB in FIG. 4 can be checked more easily through the other-vehicle setting checking screen S of the display device 13 of the master machine VA in FIG. 5.

Although not illustrated, a master-machine-side operation panel 12A of the master machine VA has the same specifications as the slave-machine-side operation panel 12B of the slave machine VB. Therefore, the operator who gets on the master machine VA can recognize at a glance the items corresponding to the setting operation tools 11 of the slave-machine-side operation panel 12B of the slave machine VB, which is reconstructed on the other-vehicle setting checking screen S of the display device 13, while referring to the master-machine-side operation panel 12A of the master machine VA.

As described above, the setting state by each setting item by each setting operation tool 11 of the slave machine VB shown in the other-vehicle setting checking screen S of the display device 13 provided in the master machine VA can easily be checked in the master machine VA. Therefore, a burden on the operator is reduced, and the cooperative control of the two tractors can easily be monitored.

Other Exemplary Embodiments

Other exemplary embodiments in which the above exemplary embodiment is modified will be described below. The following other exemplary embodiments can be applied in combination with the above embodiment as long as inconsistency is not generated. The scope of the present invention is not limited to the contents of each embodiment.

(1) In the above exemplary embodiment, the master machine VA and the slave machine VB have the same configuration by way of example. However, the embodiment of the present invention is not limited to the above exemplary embodiment. The master machine VA may be different from the slave machine VB in the configuration.

(2) In the above exemplary embodiment, the two tractors of the master machine VA and the slave machine VB are cooperatively controlled by way of example. However, the embodiment of the present invention is not limited to the above exemplary embodiment. For example, at least three tractors of the master machine VA and at least two slave machines VB may cooperatively be controlled. In this case, the other-vehicle setting checking screen S of the display device 13 provided in the master machine VA can be switched in each slave machine VB.

(3) In the above exemplary embodiment, by way of example, the picture imitating the actual shape of the setting operation tool 11 of the slave machine VB is shown in the other-vehicle setting checking screen of the display device 13 of the master machine VA. However, the embodiment of the present invention is not limited to the above exemplary embodiment. For example, a picture different from the actual shape showing the setting state of the setting operation tool 11 of the slave machine VB or estimation showing the setting state of the setting operation tool 11 may be shown in the other-vehicle setting checking screen of the display device 13 of the master machine VA.

(4) In the above exemplary embodiment, by way of example, in the other-vehicle setting checking screen S of the display device 13 of the master machine VA, the setting state of each setting operation tool 11 is shown while the actual arrangement mode of the plurality of setting operation tools 11 in the slave-machine-side operation panel 12B of the slave machine VB is maintained. However, the embodiment of the present invention is not limited to the above exemplary embodiment. For example, in the other-vehicle setting checking screen S of the display device 13 of the master machine VA, the setting state by each setting operation tool 11 may be shown while the actual arrangement mode of the plurality of setting operation tools 11 in the slave-machine-side operation panel 12B of the slave machine VB is rearranged.

(5) In the above exemplary embodiment, by way of example, only the portion corresponding to some of the plurality of items that can be set on the slave-machine-side operation panel 12B of the slave machine VB is shown in the other-vehicle setting checking screen of the display device 13 of the master machine VA. However, the embodiment of the present invention is not limited to the above exemplary embodiment. For example, all of the plurality of items that can be set on the slave-machine-side operation panel 12B of the slave machine VB may be shown in the other-vehicle setting checking screen of the display device 13 of the master machine VA.

(6) In the above exemplary embodiment, by way of example, the tractor is provided with the four-wheeled traveling device 1. However, the embodiment of the present invention is not limited to the above exemplary embodiment. For example, the four-wheeled traveling device 1 may be replaced with a crawler traveling device 1 or a semi-crawler traveling device 1.

(7) In the above exemplary embodiment, by way of example, the work terminal 6 is an on-vehicle type fixed to the driving section 2 of the tractor. However, the embodiment of the present invention is not limited to the above exemplary embodiment. For example, the work terminal 6 may be a portable type that can be taken out to the outside of the tractor. Alternatively, two types of the on-vehicle type and the portable type may be included as the work terminal 6, and these may be used together.

(8) In the above exemplary embodiment, by way of example, the work terminal 6 includes the acquisition unit 15 that acquires the traveling work parameters P and the display control unit 16 that causes the master-machine-side display device 13 of the master machine VA to display the information based on the traveling work parameters P. However, the embodiment of the present invention is not limited to the above exemplary embodiment. For example, a stationary management computer is provided at a remote place far away from the tractor, and the management computer may have functions of the acquisition unit 15 and the display control unit 16. In this case, the management computer derives the information acquiring and displaying the traveling work parameters P of the slave machine VB by remote communication, transmits the information to the master machine VA by remote communication, and causes the display device to display the information.

A work vehicle according to the embodiment of the present invention includes: a display device that can display information; a communication unit that can communicate with another work vehicle capable of performing cooperative work; an acquisition unit that acquires, from the other work vehicle through the communication unit, traveling work parameters manually set in each item by a plurality of setting operation tools provided on an operation panel included in the other work vehicle; and a display control unit that causes the display device to display other-vehicle setting checking screen based on the traveling work parameters acquired by the acquisition unit, the other-vehicle setting checking screen virtually showing a state of the operation panel including a setting state by each of the setting operation tools of the other work vehicle.

According to the embodiment of the present invention, the acquisition unit acquires, through the communication unit, the traveling work parameters manually set in the other work vehicle, and the state of the operation panel including the setting state by each of the setting operation tools of the other work vehicle is reconstructed as an image and a moving image based on the acquired traveling work parameters of the other work vehicle, and virtually shown in the other-vehicle setting checking screen of the display device in a visually easily understandable state. Because the image and the moving image are reconstructed on the other-vehicle setting checking screen of the display device based on the traveling work parameters of the other work vehicle, the display can be performed in a visually easily understandable mode compared with the case that, for example, the operation panel of the other work vehicle is photographed and the photographed image and the moving image are entirely displayed in the display device.

Therefore, according to the embodiment of the present invention, the setting state of the other work vehicle that can perform the cooperative work can easily be checked.

Preferably, a picture imitating an actual shape of each of the setting operation tools is shown in the other-vehicle setting checking screen.

With this configuration, the picture imitating the actual shape of each setting operation tool disposed in the operation panel of the other work vehicle is shown in the other-vehicle setting checking screen of the display device, so that the operator can easily recognize the setting state of the other work vehicle.

Preferably, in the embodiment of the present invention, the setting state by each setting operation tool is shown in the other-vehicle setting checking screen while an actual arrangement mode of the plurality of setting operation tools is maintained.

With this configuration, the image and the moving image, which are reconstructed based on the traveling work parameters, are shown in the other-vehicle setting checking screen of the display device while the actual arrangement mode of the setting operation tools in the other work vehicle is maintained, so that the operator can easily recognize the setting state of the other work vehicle.

Preferably, in the embodiment of the present invention, only a portion corresponding to some of the plurality of items that can be set on the operation panel is shown in the other-vehicle setting checking screen.

With this configuration, in the other-vehicle setting checking screen of the display device, for example, only a necessary portion such as the portion corresponding to the items associated with the plurality of setting operation tools capable of manually setting the traveling work parameters can be shown instead of showing all of the plurality of items that can be set on the operation panel. Therefore, the operator can check the setting state of the other work vehicle while unnecessary information is removed.

An other-vehicle monitoring system according to the embodiment of the present invention includes: a first work vehicle; a second work vehicle that can perform cooperative work with the first work vehicle; a communication system that communicably connects the first work vehicle and the second work vehicle; a display device that is included in the first work vehicle and can display information; and an operation panel that is included in the second work vehicle and includes a plurality of setting operation tools capable of manually setting a traveling work parameters in each item. The first work vehicle acquires the traveling work parameters from the second work vehicle through the communication system, and causes the display device to display an other-vehicle setting checking screen based on the acquired traveling work parameters, the other-vehicle setting checking screen virtually showing a state of the operation panel including a setting state by each of the setting operation tools of the second work vehicle.

According to the embodiment of the present invention, the first work vehicle acquires, through the communication system, the traveling work parameters manually set in the second work vehicle, and the state of the operation panel including the setting state by each of the setting operation tools of the second work vehicle is reconstructed as an image and a moving image based on the acquired traveling work parameters of the second work vehicle, and virtually shown in the other-vehicle setting checking screen of the display device of the first work vehicle in the visually easily understandable state. Because the image and the moving image are reconstructed on the other-vehicle setting checking screen of the display device of the first work vehicle based on the traveling work parameters of the second work vehicle, the display can be performed in a mode that is easy to recognize by the operator in addition to a simple structure compared with the case that, for example, the operation panel of the second work vehicle is photographed using a camera and the image and the moving image photographed using the camera are directly displayed in the display device of the first work vehicle.

Therefore, according to the embodiment of the present invention, the setting state of the other work vehicle that can perform the cooperative work can easily be checked.

INDUSTRIAL APPLICABILITY

In addition to the tractor, the embodiment of the present invention can be used for monitoring another work vehicle when the cooperative work is performed between a work vehicle such as agricultural vehicles including a combine and a rice transplanter and the other work vehicle.

Obviously, numerous modifications and variations of the present invention are possible in light of the above teachings. It is therefore to be understood that within the scope of the appended claims, the invention may be practiced otherwise than as specifically described herein.

What is claimed is:

1. A work vehicle comprising:
a display to display information;
communication circuitry configured to receive traveling work parameters sent from a cooperative work vehicle that is configured to work cooperatively with the work vehicle when tangible operation tools provided on an operation panel in the cooperative work vehicle are manually operated to set the traveling work parameters, the traveling work parameters indicating settings of a work device in the cooperative work vehicle, the traveling work parameters comprising
an orientation mode of the work device indicating an orientation of the work device with respect to an inclination of a field in which the cooperative work vehicle is to work, the orientation of the work device being configured to be automatically controlled by the cooperative work vehicle based on the orientation mode and the inclination of the field; and
circuitry configured to
display a computer graphics image in the display based on the traveling work parameters received through the communication circuitry, the computer graphics image showing the tangible operation tools which indicate the traveling work parameters,
wherein the traveling work parameters further comprise an attachment type indicating how the work device is attached to the cooperative work vehicle, and
wherein the orientation of the work device is automatically controlled based on the attachment type, the orientation mode, and the inclination of the field simultaneously.

2. The work vehicle according to claim 1, wherein an actual shape of each of the tangible operation tools is transformed into an artificial shape in the computer graphics image.

3. The work vehicle according to claim 1, wherein the tangible operation tools are arranged in a panel layout of the operation panel in the cooperative work vehicle,
and wherein the tangible operation tools are arranged in the panel layout in the computer graphics image.

4. The work vehicle according to claim 1, wherein the computer graphics image shows a portion of the tangible operation tools.

5. The work vehicle according to claim 1,
wherein the traveling work parameters further comprise a type of the work device chosen among various types of work devices.

6. The work vehicle according to claim 1,
wherein the traveling work parameters further comprise at least one of:
whether the work device is automatically raised while the cooperative work vehicle turns; or
whether the work device is automatically raised while the cooperative work vehicle travels backward.

7. A cooperative work vehicle monitoring system comprising:
a first work vehicle comprising:
a display to display information;
a second work vehicle to work cooperatively with the first work vehicle, the second work vehicle comprising:
an operation panel including tangible operation tools via which traveling work parameters indicating settings of a work device are manually set, the traveling work parameters comprising an orientation mode of the work device indicating an orientation of the work device with respect to an inclination of a field in which the second work vehicle is to work, the orientation of the work device being configured to be automatically controlled by the second work vehicle based on the orientation mode and the inclination of the field; and a communication system via which the second work vehicle is configured to send the traveling work parameters to the first work vehicle when the tangible operation tools are manually operated to set the traveling work parameters, the first work vehicle further comprising:
circuitry configured to
receive the traveling work parameters from the second work vehicle through the communication system, and
display a computer graphics image in the display based on the traveling work parameters received through the communication system, the computer graphics image showing the tangible operation tools which indicate the traveling work parameters,
wherein the traveling work parameters further comprise an attachment type indicating how the work device is attached to the second work vehicle, and
wherein the orientation of the work device is automatically controlled based on the attachment type, the orientation mode, and the inclination of the field simultaneously.

8. The cooperative work vehicle monitoring system according to claim 7,
wherein the tangible operation tools are arranged in a panel layout of the operation panel in the second work vehicle, and
wherein the tangible operation tools are arranged in the panel layout in the computer graphics image.

9. The cooperative work vehicle monitoring system according to claim 7, wherein the traveling work parameters further comprise a type of the work device chosen among various types of work devices.

10. The cooperative work vehicle monitoring system according to claim 7,
wherein the traveling work parameters further comprise at least one of:
whether the work device is automatically raised while the second work vehicle turns; or
whether the work device is automatically raised while the second work vehicle travels backward.

11. A control method for a work vehicle, comprising:
receiving traveling work parameters sent from a cooperative work vehicle that is configured to work cooperatively with the work vehicle when tangible operation tools provided on an operation panel in the cooperative work vehicle are manually operated to set the travelling work parameters, the traveling work parameters indicating settings of a work device in the cooperative work vehicle, the traveling work parameters comprising
an orientation mode of the work device indicating an orientation of the work device with respect to an inclination of a field in which the cooperative work vehicle is to work, the orientation of the work device being configured to be automatically controlled by the cooperative work vehicle based on the orientation mode and the inclination of the field, and
displaying a computer graphics image in a display based on the traveling work parameters received, the computer graphics image showing the tangible operation tools which indicate the traveling work parameters,
wherein the traveling work parameters further comprise an attachment type indicating how the work device is attached to the cooperative work vehicle, and
wherein the orientation of the work device is automatically controlled based on the attachment type, the orientation mode, and the inclination of the field simultaneously.

12. The control method according to claim 11,
wherein the tangible operation tools are arranged in a panel layout of the operation panel in the cooperative work vehicle, and
wherein the tangible operation tools are arranged in the panel layout in the computer graphics image.

13. The control method according to claim 11, wherein the traveling work parameters further comprise a type of the work device chosen among various types of work devices.

14. The control method according to claim 11,
wherein the traveling work parameters further comprise at least one of:
whether the work device is automatically raised while the cooperative work vehicle turns; or
whether the work device is automatically raised while the cooperative work vehicle travels backward.

15. A work vehicle comprising:
a display;
communication circuitry configured to receive traveling work parameters sent from a cooperative work vehicle through the communication circuitry when tangible operation tools provided in the cooperative work vehicle are manually operated to set the traveling work parameters, the traveling work parameters indicating settings of a work device in the cooperative work vehicle, the traveling work parameters comprising
an orientation mode of the work device indicating an orientation of the work device with respect to an inclination of a field in which the cooperative work vehicle is to work, the orientation of the work device being configured to be automatically controlled by the cooperative work vehicle based on the orientation mode and the inclination of the field; and
display circuitry configured to display a computer graphics image in the display based on the traveling work parameters, the computer graphics image showing the tangible operation tools which indicate the traveling work parameters,
wherein the traveling work parameters further comprise an attachment type indicating how the work device is attached to the cooperative work vehicle, and
wherein the orientation of the work device is automatically controlled based on the attachment type, the orientation mode, and the inclination of the field simultaneously.

16. The work vehicle according to claim 15,
wherein the traveling work parameters further comprise a type of the work device chosen among various types of work devices.

17. The work vehicle according to claim 15,
wherein the traveling work parameters further comprise at least one of:
whether the work device is automatically raised while the cooperative work vehicle turns; or whether the work device is automatically raised while the cooperative work vehicle travels backward.

* * * * *